United States Patent [19]
Forgash et al.

[11] Patent Number: 5,687,776
[45] Date of Patent: Nov. 18, 1997

[54] METHOD AND APPARATUS FOR FUELING VEHICLES WITH LIQUEFIED CRYOGENIC FUEL

[75] Inventors: David John Forgash, Naperville; Raymond Korzonas, Palos Hills, both of Ill.; Bryan Patrick Neuhalfen, Lake Charles, La.; George D. Rhoades, LaGrange; Jack Wayne Sudduth, Clarendon Hills, both of Ill.; Mervyn Ladd Conrad, Oak Harbor, Wash.; Richard John Kooy, Western Springs, Ill.

[73] Assignee: Chicago Bridge & Iron Technical Services Company, Oak Brook, Ill.

[21] Appl. No.: 270,011

[22] Filed: Jul. 1, 1994

Related U.S. Application Data

[63] Continuation-in-part of Ser. No. 117,355, Sep. 7, 1993, Pat. No. 5,325,894, which is a continuation of Ser. No. 986,997, Dec. 7, 1992, abandoned.

[51] Int. Cl.$^6$ ............................. B65B 31/00; F17C 9/04
[52] U.S. Cl. ........................... 141/11; 141/4; 141/18; 141/2; 141/82; 62/50.4; 62/50.2
[58] Field of Search ............................. 141/1, 4, 5, 11, 141/2, 18, 82, 197; 62/50.1, 50.2, 50.4, 50.3, 45.1; 222/146.2, 146.4, 146.5, 318, 71; 137/501

[56] References Cited

U.S. PATENT DOCUMENTS

| | | | |
|---|---|---|---|
| 2,576,984 | 12/1951 | Wildhack | 62/1 |
| 2,945,354 | 7/1960 | Moskowitz | 62/50.2 |
| 3,195,316 | 7/1965 | Maher et al. | 62/50.2 |
| 3,271,965 | 9/1966 | Maher et al. | 62/23 |
| 3,507,302 | 4/1970 | Scott | 137/501 |
| 3,864,918 | 2/1975 | Lorenz | 60/651 |
| 3,885,394 | 5/1975 | Witt et al. | 60/651 |
| 3,990,256 | 11/1976 | May et al. | 62/53 |
| 4,276,749 | 7/1981 | Crowley | 62/50.2 |
| 4,292,062 | 9/1981 | Dinulescu et al. | 62/7 |
| 4,406,129 | 9/1983 | Mills | 62/7 |
| 4,475,348 | 10/1984 | Remes | 62/55 |
| 4,505,249 | 3/1985 | Young | 123/527 |
| 4,527,600 | 7/1985 | Fisher et al. | 141/4 |
| 4,531,558 | 7/1985 | Engel et al. | 141/44 |
| 4,887,857 | 12/1989 | Van Ommeren | 141/1 |
| 4,966,206 | 10/1990 | Bauman et al. | 141/83 |
| 4,987,932 | 1/1991 | Pierson | 141/1 |

(List continued on next page.)

FOREIGN PATENT DOCUMENTS

| | | |
|---|---|---|
| 0219995 | 9/1988 | Japan . |
| 1130715 | 12/1984 | U.S.S.R. . |
| WO 94/16986 | 8/1994 | WIPO . |

OTHER PUBLICATIONS

Ditmeyer. "Burlington Northern Railroad's Natural Gas Locomotive Project." Presented at Texas' 3rd Annual Alternative Vehicle Fuels Market Fair and Sumposium, Austin, Texas, Apr. 13, 1992.

Stolz. "Operating A Locomotive On Liquid Methane Fuel," *Pipeline and Gas Journal*, Apr. 1992, (pp. 45–49).

*Primary Examiner*—Henry J. Recla
*Assistant Examiner*—Steven O. Douglas
*Attorney, Agent, or Firm*—Marshall, O'Toole, Gerstein, Murray & Borun

[57] ABSTRACT

Apparatus for, and a method of, withdrawing liquefied cryogenic fuel stored in a primary insulated storage tank at a low pressure and at a temperature close to its boiling point; increasing the pressure of the withdrawn liquefied cryogenic fuel and then feeding the pressurized liquefied cryogenic fuel through a heat exchanger to warm the liquefied cryogenic fuel to a subcooled or near saturated liquid condition; and feeding the said warmed and pressurized liquefied cryogenic fuel to an insulated tank on a vehicle at a refueling facility, the vehicle using liquefied cryogenic fuel as its fuel and the insulated vehicle fuel tank being adapted to safely contain and store the said liquefied cryogenic fuel in liquid form, at an approximate saturated condition.

26 Claims, 7 Drawing Sheets

U.S. PATENT DOCUMENTS

| | | | |
|---|---|---|---|
| 5,029,622 | 7/1991 | Mutter | 141/4 |
| 5,081,977 | 1/1992 | Swenson | 123/527 |
| 5,107,906 | 4/1992 | Swenson et al. | 141/11 |
| 5,121,609 | 6/1992 | Cieslukowski | 62/50.4 |
| 5,127,230 | 7/1992 | Neeser et al. | 62/7 |
| 5,163,409 | 11/1992 | Gustafson et al. | 123/525 |
| 5,211,021 | 5/1993 | Pierson | 62/50.2 |
| 5,228,295 | 7/1993 | Gustafson | 62/7 |
| 5,231,838 | 8/1993 | Cieslokowski | 62/50.4 |
| 5,243,821 | 9/1993 | Schuck et al. | 62/50.6 |
| 5,325,894 | 7/1994 | Kooy et al. | 141/4 |
| 5,327,730 | 7/1994 | Myers et al. | 62/9 |
| 5,353,849 | 10/1994 | Sutton et al. | 141/82 |
| 5,360,139 | 11/1994 | Goode | 222/318 |
| 5,373,702 | 12/1994 | Kalet et al. | 62/50.2 |

5,687,776

METHOD AND APPARATUS FOR FUELING VEHICLES WITH LIQUEFIED CRYOGENIC FUEL

This is a continuation-in-part of allowed U.S. application Ser. No. 08/117,355, filed Sep. 7, 1993, now U.S. Pat. No. 5,325,894 as a continuation of U.S. application Ser. No. 07/986,997, filed Dec. 7, 1992, now abandoned.

This invention relates to the storage and dispensing of cryogenic fuels used to fuel engines. More particularly, this invention is concerned with apparatus and methods for storing and dispensing liquefied cryogenic fuels such as liquefied natural gas (LNG), methane, ethane, ethylene, or hydrogen as a fuel for engines in vehicles of all types.

BACKGROUND OF THE INVENTION

Due to the increased costs of liquid fuels, such as gasoline and diesel fuel, as the energy source for engines in automobiles, trucks, buses, boats, ships, aircraft, tractors and off-the-road construction equipment such as cranes, earth movers and bulldozers, all of which are considered to be vehicles for the purpose of this invention, there has been increased interest in using natural gas and other cryogenic fuels to fuel such engines. Also, in many areas of the world natural gas is abundantly available while petroleum products such as gasoline and diesel fuel are very scarce and expensive. Additionally, engines fueled with cyrogenic fuels such as methane or hydrogen generally produce combustion products which have a much lower polluting effect than do gasoline and diesel fuel.

Because cryogenic fuels at ambient temperature and atmospheric pressure have a relatively low volumetric energy content it is not practical to store them at these conditions in a vehicle fuel tank. For example, it is customary to store natural gas in a fuel tank under very high pressures of about 2000 to 4000 psig. See Swenson et al U.S. Pat. No. 5,107,906; Pierson U.S. Pat. No. 4,987,932; Fisher et al U.S. Pat. No. 4,527,600 and Young U.S. Pat. No. 4,505,249.

It has been previously proposed to store a cryogenic liquid fuel, such as liquefied natural gas, in an insulated fuel tank at a saturated thermodynamic state wherein the liquid is in equilibrium with the vapor. Mills U.S. Pat. No. 4,406,129 discloses a cryogenic liquid fuel in a vehicle tank and the use of the liquid and vapor to fuel a vehicle engine. However, this patent does not disclose the source of the cryogenic liquid fuel, how it was dispensed or filled into the vehicle tank or its temperature and pressure in the tank.

It has been recognized for many years that a very practical way to store bulk quantities of liquefied gases in a tank is at low pressures and low temperatures. For example, liquefied natural gas may be stored at a pressure of about 5 psig to 150 psig and a temperature of about −252° F. to −186° F. See Maher et al U.S. Pat. No. 3,195,316. Storing liquefied natural gas at such a low pressure in a vehicle tank, however, may be undesirable because the low pressure may be unsuitable for practical operation of some engines, particularly fuel injected engines. A need accordingly exists for improved apparatus and methods of filling a vehicle fuel tank with liquefied natural gas.

SUMMARY OF THE INVENTION

According to the invention, an apparatus is provided comprising a primary insulated storage tank containing liquefied cryogenic fuel at a low pressure and at a temperature close to its boiling point, a heat exchanger, a first conduit communicating with the primary storage tank and with the heat exchanger, a pump for withdrawing liquefied cryogenic fuel from the primary tank, increasing the pressure of the withdrawn liquefied cryogenic fuel and feeding it through the first conduit to the heat exchanger wherein the pressurized liquefied cryogenic fuel is warmed to a subcooled or near saturated condition, a second conduit communicating with the heat exchanger and having means for communicating with a vehicle fuel tank, receives the warmed and pressurized liquefied cryogenic fuel from the heat exchanger and feeds it to a vehicle fuel tank for storage as a liquid therein at an approximate saturated condition.

The apparatus may include a stationary cryogenic fuel dispensing tank that stores warmed and pressurized liquefied cryogenic fuel received at least in part from the heat exchanger. A conduit able to connect to a vehicle fuel tank feeds warmed and pressurized cryogenic fuel from the dispensing tank to a vehicle fuel tank.

In the apparatus of this invention, cryogenic fuel vapor which accumulates in the primary insulated storage tank can be withdrawn by a compressor and combined with the liquefied cryogenic fuel withdrawn from the primary insulated storage tank to form a combined stream which is then fed through the heat exchanger. This maximizes the amount of fuel effectively used and minimizes gas emissions to the environment.

Excess vapor which forms in the dispensing tank can be returned to the primary insulated storage tank, reducing gas emissions to the environment. Also, liquefied cryogenic fuel can be withdrawn from the primary storage tank and be fed directly into admixture with liquefied cryogenic fuel withdrawn from the dispensing tank to form a blended mixture which is fed to the vehicle tank.

The apparatus can include a conduit for withdrawing liquefied cryogenic fuel from the primary storage tank, pressurizing the withdrawn liquefied cryogenic fuel and feeding it into admixture with warmed liquefied cryogenic fuel withdrawn from the heat exchanger to thereby form a blended stream of warmed and pressurized liquefied cryogenic fuel to be fed either to the vehicle fuel tank or to the dispensing tank.

The apparatus can also have a conduit for withdrawing liquefied cryogenic fuel from the primary storage tank, pressurizing the withdrawn liquefied cryogenic fuel and feeding it into admixture with warmed liquefied cryogenic fuel withdrawn from the dispensing tank to thereby form a blended stream of warmed and pressurized liquefied cryogenic fuel to feed to the vehicle fuel tank. Additionally, a conduit can be included for withdrawing cryogenic fuel vapor from the dispensing tank and returning it to the primary storage tank.

The apparatus can also have a vertical tube ambient heat exchanger with a continuous horizontal bottom inlet and a continuous horizontal top outlet that minimizes heat gain to the system.

Conventional vehicle tanks include self-actuated pressure regulators which control the pressure within preset limits by selectively allowing either liquid only or liquid and vapor to flow from the fuel tank to the vehicle's engine. If this system fails or the vehicle is not used for prolonged periods of time and the liquid temperature rises substantially, the vehicle tank pressure may rise above its normal operating range. Stationary pumps that deliver fuel have a certain pressure delivery capacity that can only deliver fuel if the delivery pressure is greater than the vehicle fuel tank pressure. The present invention accommodates vehicle fuel tank pressures substantially above fueling system pressure by including, a primary insulated storage tank containing, for example, liquefied cryogenic fuel, a heat exchanger which receives liquefied cryogenic fuel that is pumped from the primary storage tank through a first conduit, and is then warmed in the heat exchanger to a subcooled or near saturated condition, a second conduit communicating with a heat exchanger and capable of communicating with a vehicle fuel tank receives warmed and pressurized cryogenic fuel from the heat exchanger and feeds it to a vehicle fuel tank for storage as a liquid therein at an approximate saturated condition, and a third conduit communicating with the primary storage tank and being capable of communicating with a vehicle fuel tank for receiving fluid from the vehicle fuel tank and returning it to the primary tank to reduce the internal pressure of the vehicle fuel tank.

When an optional dispensing tank is used to store warmed and pressurized liquefied cryogenic fuel from the heat exchanger, the third conduit may communicate with the dispensing tank and feed the fluid from the vehicle fuel tank to it, rather than returning warm and pressurized gas to the bulk storage tank. The third conduit may include a pump or it may include a temperature control valve that receives, via a fourth conduit, pressurized liquefied cryogenic fuel from the first conduit so that a mixture is fed to the vehicle fuel tank.

A method in accordance with this invention includes, withdrawing liquefied cryogenic fuel from a primary insulated storage tank at a low pressure and at a temperature close to its boiling point, increasing the pressure of the withdrawn liquefied cryogenic fuel and then feeding it through a heat exchanger to warm the liquefied cryogenic fuel to a subcooled or near saturated liquid condition reducing the internal pressure of an insulated vehicle fuel tank by returning fluid to the primary insulated storage tank (or a dispensing tank when present), the vehicle fuel tank being adapted to safely contain and store the liquefied cryogenic fuel in liquid form at an approximate saturated condition, and feeding warmed and pressurized liquefied cryogenic fuel to the vehicle fuel tank.

The stationary tanks, such as the primary bulk storage tank and the dispensing tank, must maintain a certain minimum pressure as liquid is withdrawn. Conventional cryogenic storage tanks have gravity-fed natural air draft finned tube ambient heat exchangers which vaporize some of the liquid in response to the opening of a self-actuated pressure regulator. The high volumetric liquid withdrawal flow rates associated with dispensing operations require that these ambient heat exchangers be very large, and a more economical means in accordance with the present invention includes a conduit communicating with the heat exchanger and the primary insulated tank for receiving the warmed and pressurized liquefied cryogenic fuel and feeding it to the primary tank to maintain the pressure in the primary storage tank above a predetermined minimum pressure. A dispensing tank may be used with this embodiment.

The same objective can be achieved by practicing a method including, withdrawing liquefied cryogenic fuel from a primary insulated storage tank at a low pressure and at a temperature close to its boiling point, increasing the pressure of the withdrawn liquefied cryogenic fuel and then feeding the pressurized liquefied cryogenic fuel through a heat exchanger to warm the liquefied cryogenic fuel to a subcooled or near saturated liquid condition, and feeding it to the primary tank to maintain the pressure in the primary tank above a predetermined minimum pressure.

When a dispensing tank is used with the present invention, a means for accommodating dispensing volumetric fluctuations is provided which maintains the pressure in the dispensing tank as it is being filled. When the dispensing tank is being filled from a nearly empty initial condition, its internal pressure will rise above the saturation pressure of the feed liquid temperature in the feed conduit because a heat load is imposed to condense the vapor in the dispensing tank as it is being replaced by liquid. It is undesirable to return this high pressure gas to the primary tank on a routine basis because the liquid in the primary tank will be unnecessarily warmed. An economical means to limit the pressure in the dispensing tank when it is being filled includes a conduit communicating with the first conduit downstream of the pump and with the dispensing tank, the conduit receives pressurized liquefied cryogenic fuel from the first conduit and feeds it to the dispensing tank to maintain the pressure in the dispensing tank below a predetermined maximum pressure.

A method for accomplishing this result includes withdrawing liquefied cryogenic fuel from a primary insulated storage tank at a low pressure and at a temperature close to its boiling point; increasing the pressure of the withdrawn liquefied cryogenic fuel and then feeding the pressurized liquefied cryogenic fuel through a heat exchanger to warm the liquefied cryogenic fuel to a near saturated liquid condition; feeding the warmed and pressurized liquefied cryogenic fuel from the heat exchanger to a stationary insulated cryogenic fuel dispensing tank and storing the liquefied cryogenic fuel at an approximate saturated condition; transferring liquefied cyrogenic fuel from the dispensing tank to a vehicle fuel tank; and feeding pressurized liquefied cyrogenic fuel to the dispensing tank to maintain the pressure in the dispensing tank below a predetermined maximum pressure.

If the vehicle fuel tank is of small capacity, then there is a need for the system to rapidly control the temperature in a feeding conduit that mixes the output of the heat exchanger and a by-pass conduit containing pressurized liquefied cyrogenic fuel. It is desirable to obtain a mix of liquefied cyrogenic fuel having desired properties without the use of additional rotating equipment such as pumps or compressors to minimize energy consumption and maintenance requirements. Such an apparatus can include: a primary insulated storage tank containing liquefied cyrogenic fuel at a low pressure and at a temperature close to its boiling point, a heat exchanger, a first conduit communicating with the primary tank and with the heat exchanger, the first conduit including a pump for withdrawing liquefied cyrogenic fuel from the primary tank, increasing the pressure of the withdrawn liquefied cyrogenic fuel and feeding it through a control valve to the heat exchanger wherein the pressurized liquefied cyrogenic fuel is converted to a vapor at a predetermined pressure and near the temperature of the heat source for the heat exchanger; a reservoir in vapor communication with the heat exchanger for receiving and storing warmed and pressurized vaporized cryogenic fuel; a second conduit for transferring warmed and pressurized liquefied cyrogenic fuel to a vehicle fuel tank at an approximate saturated condition; a liquid conduit communicating with the first conduit downstream of the pump and with the second conduit, the liquid conduit including a control valve for receiving and controlling the flow of pressurized liquefied cyrogenic fuel from the primary tank to the second conduit for mixture with the warmed and pressurized cryogenic fuel from the reservoir in the second conduit to form pressurized liquefied cyrogenic fuel at a subcooled or near saturated condition.

When a stationary dispensing tank is used, the liquid conduit and the mixed stream of warmed and pressurized cryogenic fuel is fed into a conduit that feeds the dispensing tank.

A method for achieving this result includes withdrawing liquefied cyrogenic fuel stored in a primary insulated storage tank at a low pressure and at a temperature close to its boiling point; increasing the pressure and temperature of some of the withdrawn liquefied cyrogenic fuel to form pressurized vaporized cryogenic fuel at a temperature approaching that of a heat source; increasing the pressure of the remainder of the withdrawn liquefied cyrogenic fuel; mixing pressurized vaporized cryogenic fuel with pressurized liquefied cyrogenic fuel to form a warmed and pressurized liquefied cyrogenic fuel at a subcooled or approximate saturated condition; and transferring warmed and pressurized cryogenic fuel to a vehicle fuel tank.

The flow rate to each vehicle need not be exactly the same but should be roughly equal because it is desirable to employ one or two large pumps versus a number of small dedicated pumps. Thus, the conduit communicating with the vehicle fuel tank may include a flow restrictor for controlling the flow of warmed and pressurized liquefied cyrogenic fuel from the heat exchanger to the vehicle fuel tank and a regulator for sensing fluid flow pressure drop across the flow restrictor and for reducing the flow of warmed and pressurized liquefied cyrogenic fuel to a vehicle fuel tank in response to high fluid flow pressure drop in the restrictor.

The invention also relates to a method and apparatus for feeding liquefied cyrogenic fuel to a vehicle tank in a subcooled or near saturated condition. An apparatus in accordance with this invention could include a primary insulated storage tank having a vapor space, a first conduit communicating with the primary storage tank and having means for communicating with a vehicle fuel tank, the first conduit including a pump for withdrawing and pressurizing liquefied cyrogenic fuel; and a second conduit communicating with the vapor space in the primary storage tank and with the first conduit downstream of the pump, the second conduit including a compressor for increasing the pressure of cryogenic fuel from the vapor space and feeding it to the first conduit for mixture with the pressurized liquefied cryogenic fuel and onto the vehicle fuel tank.

The liquefied cryogenic fuel in the primary insulated storage tank desirably is at about 5 psig to 150 psig and a temperature of about −252° F. to −186° F.

DETAILED DESCRIPTION OF THE DRAWINGS

To the extent it is reasonable and practical the same or similar elements which appear in the various drawing figures will be illustrated by the same numbers. As used herein, the term "cryogenic fuel" includes natural gas, methane, ethane, ethylene, and hydrogen. For simplicity, the following detailed description refers to natural gas only, but it should be understood that other cryogenic fuels may be used in the invention as well.

Figure 1:
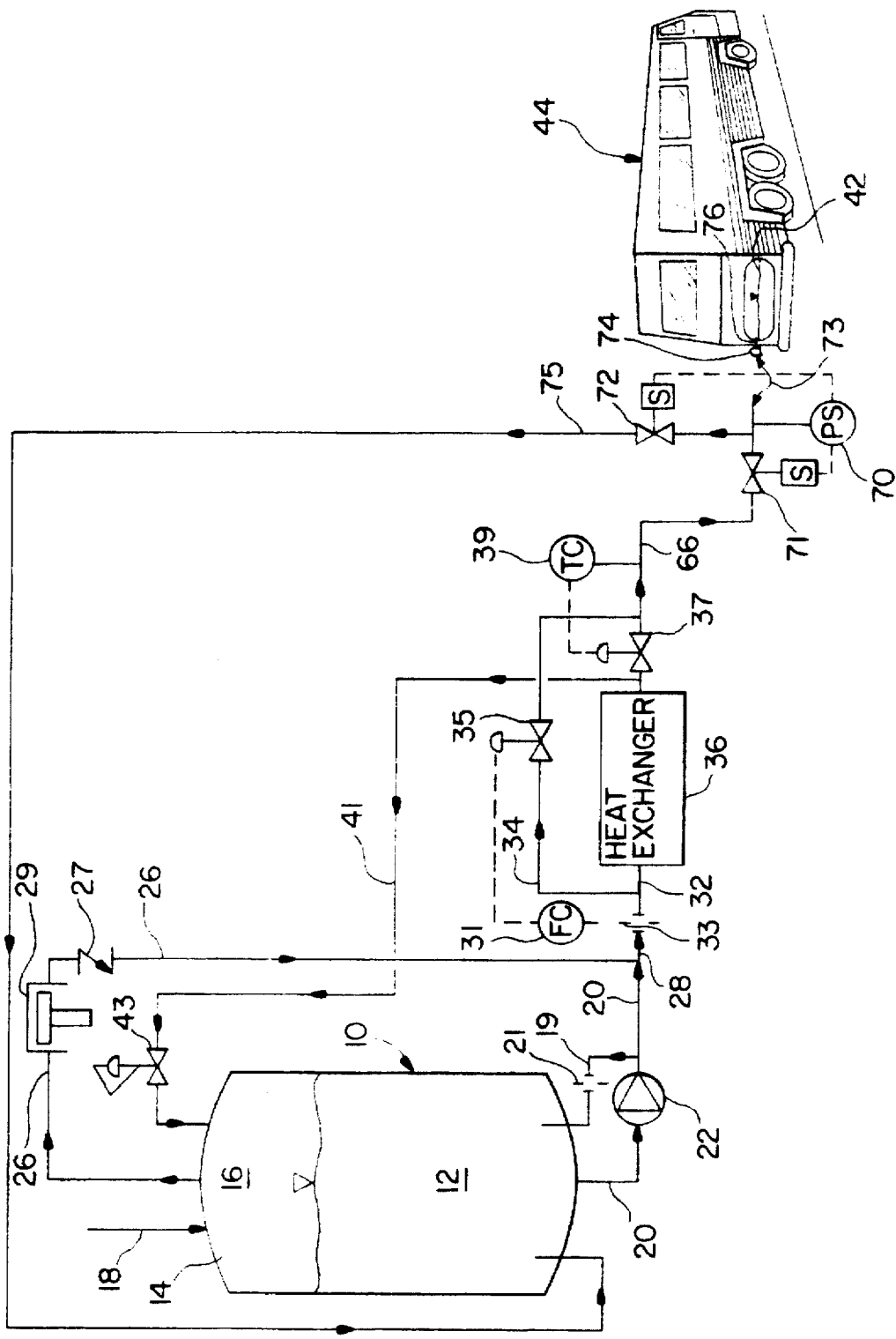
FIG. 1 diagrammatically illustrates a first embodiment of apparatus useful in practicing the invention.

With reference to FIG. 1, which illustrates a first embodiment of the invention, the insulated primary tank 10 is constructed of suitable material so as to safely store a volume of liquefied natural gas or methane 12 at a relatively low pressure, for example at about 5 psig to 150 psig and corresponding saturation temperature of about −252° F. to −186° F. A vapor space 14 in the upper part of primary tank 10 is provided so as to accumulate vapor 16 which forms as a result of heat flow from the atmosphere into the tank. Conduit 18 communicates with the interior of tank 10 and provides a means for filling the tank with liquefied natural gas.

Conduit 20 communicates with the lower interior space of tank 12 and with heat exchanger 36. Pump 22 is located in conduit 20. Conduit 20 thus provides a means for withdrawing a stream of liquefied natural gas from primary tank 10 and feeding it to the heat exchanger 36. The pump 22 may require a minimum circulation rate at all times. When not fueling vehicles, valves 71 and 72, downstream of pump 22, are closed and the liquefied natural gas is forced to flow back to primary tank 10 through conduit 19. When the downstream fueling valve 71 is open, for example, flow through conduit 21 is restricted by an orifice 21 or other similar flow restricting device so that most of the flow is forced downstream of conduit 19.

Natural gas vapor which accumulates in vapor space 16 is optionally, but not necessarily, withdrawn therefrom through conduit 26 which communicates with the vapor space and with conduit 20 upstream of the heat exchanger 36 but downstream of pump 22. Vapor pump or compressor 29 is provided in conduit 26 to increase the pressure of the vapor fed to conduit 20 and check valve 27 prevents fluid flow back into vapor space 16. By blending the vapor stream from conduit 26 into admixture with the liquefied natural gas stream in conduit 20 the vapor is condensed and the liquid is warmed slightly.

The liquefied natural gas stream is then delivered by conduit 20 to conduit 28 which communicates with and feeds the liquid to conduit 32. Conduit 28 includes a restriction device 33 through which the flow rate of liquid can be measured by a flow controller 31. Flow controller 31 permits a portion of the liquefied natural gas stream through conduit 28 to bypass the heat exchanger for mixture with warmed natural gas exiting the heat exchanger 36 and thereby controls the approximate flow rate through the restriction device 33. Temperature controller 39 permits an amount of warmed natural gas in conduit 38 to mix with cold liquid in conduit 34 in desired proportions to attain desired temperature for delivery to conduit 66. The liquefied natural gas is fed from conduit 32 into the inlet side of heat exchanger 36.

Further, as liquefied natural gas flows through the heat exchanger 36, its temperature may be raised to any desirable level, including that which vaporizes the liquid, so long as the mixed temperature in conduit 66 may approach a subcooled or saturated condition, such as to about −238° F. to −126° F. at a corresponding pressure of about 20 psig to 550 psig. The heat needed to raise the temperature of the liquefied natural gas can be indirectly supplied by ambient or heated air or water, or any other suitable heat exchange fluid, which can be fed to the heat exchanger at a flow rate which will raise the liquefied natural gas temperature to the extent desired, eliminating the need for bypass conduit 34.

The warmed liquefied natural gas is withdrawn from the heat exchanger 36 by conduit 38 and is fed to conduit 66. The combined streams of liquefied natural gas from conduits 34 and 38 are fed to conduit 66, the end of which is in temporary and removable communication with insulated vehicle fuel tank 42 located at the rear of bus 44 via hose 73 and disconnectable coupling 74. When connected, the pressure in vehicle fuel tank 42 equates with the pressure in hose 73. The warmed liquefied natural gas is fed from conduit 66 into insulated fuel tank 42 until the tank 42 is essentially filled. Valve 71 is then closed, and the hose 73 and coupling 74 are removed from vehicle fuel tank 42 and the tank 42 is capped.

Conduit 41 communicates upstream with conduit 38 and downstream with the primary storage tank 10. Alternatively, it may communicate upstream with the mixed fluid conduit 66. In either configuration, conduit 41 includes a back pressure regulator 43 which opens when pressure in primary storage tank 10 drops below the setpoint of regulator 43. In this manner, the pressure in primary tank 10 can be maintained above a minimum pressure with the output of heat exchanger 36. The operation of compressor 29 is unaffected and is still useful to maintain the pressure in primary tank 10 below a maximum value.

Alternatively, regulator 43 can be replaced by a valve (not illustrated) which opens in response to a pressure switch sensing a drop in pressure in primary tank 10.

Moving downstream, conduit 66 includes valve 71 for controlling the flow of liquefied natural gas. Conduit 75 communicates with conduit 66 downstream of valve 71 and with the primary storage tank 10. Conduit 75 includes valve 72. Both valves 71 and 72 are activated by a pressure switch 70. When hose 73 is connected to a vehicle fuel tank 42, pressure switch 70 senses whether the pressure in the hose 73 (which is equal to the pressure in the vehicle fuel tank) is higher than a predetermined set point. If so, valve 72 is opened and valve 71 remains closed. This interaction enables high pressure fluid in the vehicle fuel tank to flow through conduit 75 to the primary storage tank 10. If, on the other hand, the pressure in hose 73 is below the predetermined set point of pressure switch 70, then valve 72 remains closed and valve 71 opens to permit liquefied natural gas to flow through conduit 66 into the vehicle fuel tank 42.

Alternatively, the pressure switch 70 can be replaced by an inlet pressure regulator (not illustrated) located downstream of valve 72 in line 75. The pressure regulator senses hose 73 pressure when valve 72 is opened in a timed sequence with valve 71 initially closed. After a preset period of time has elapsed and fluid from vehicle fuel tank 42 is fed to conduit 75, valve 72 is closed and valve 71 is opened to permit liquefied natural gas to flow from conduit 66 to vehicle fuel tank 42.

To minimize the operating pressure fluctuations in primary tank 10, conduit 75 preferably enters the bottom of the primary tank 10 so that the warmer, higher pressure fluid from vehicle fuel tank 42 is absorbed by the liquid rather than the vapor contents of the tank. In particular, the elevation of the outlet of conduit 75 is preferably spaced above and laterally apart from the entrance of conduit 20, to minimize the possibility that any vapor in conduit 75 becomes entrained in conduit 20 and upsets a pump or the process.

Figure 2:
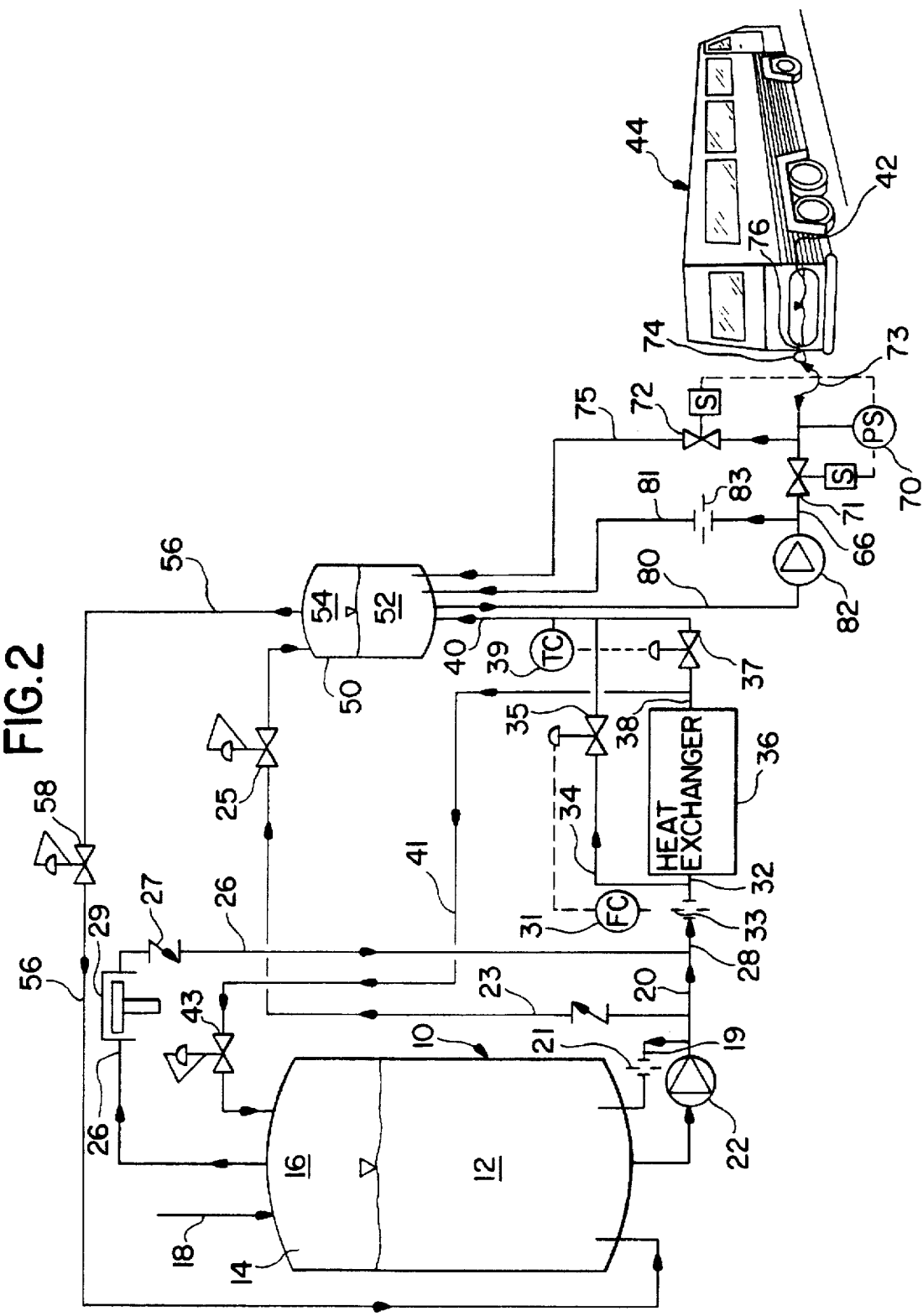
FIG. 2 diagrammatically illustrates a second embodiment of apparatus useful in practicing the invention.

FIG. 2 illustrates another embodiment of the invention. It will be readily seen that this embodiment incorporates the primary tank 10 and heat exchanger 36 as well as many of the conduits, pump 22 and compressor 29 forming part of the first embodiment shown in FIG. 1.

Conduit 28 communicates with flow controller 31 and conduit 32 which communicates with heat exchanger 36 and serves to feed a stream of cold liquefied natural gas from the flow controller 31 to the heat exchanger 36 in which the liquefied natural gas is warmed and subsequently fed therefrom into conduit 38 which feeds the stream of liquefied natural gas to conduit 40.

Conduit 34 also communicates with flow controller 31 and with conduit 40. Conduit 34 provides a means for feeding cold liquefied natural gas around or past the heat exchanger 36 and into admixture with the liquefied natural gas fed by conduit 38 to conduit 40. Temperature controller 39 and control valve 37 provide a system by which the temperature and inherently the pressure of the liquefied natural gas fed by conduit 40 to insulated dispensing tank 50 can be controlled. Thus, temperature controller 39 responds to the temperature of the liquefied natural gas 52 in conduit 40 and by signal means actuates control valve 37 so that liquefied natural gas fed by conduit 38 to the control valve 37 is proportioned with liquefied natural gas 52 from conduit 34. Under appropriate circumstances the flow through conduit 32 could be from 0 to 100% of the flow in conduit 28, and the flow through conduit 34 could be from 0 to 100% of the flow in conduit 28.

Liquefied natural gas 12 is stored in dispensing tank 50 in a saturated condition at a temperature of about −238° F. to −126° F. and a corresponding pressure of about 20 psig to 550 psig. Vapor 54 which accumulates in the upper interior space of dispensing tank 50 is withdrawn through conduit 56 and is returned to the interior of primary storage tank 10. Pressure relief valve 58 in conduit 56 is set to open at a predetermined higher vapor pressure than the pressure normally present in the vapor space of the dispensing tank 50.

As stated above, with respect to FIG. 1, vehicle fuel tank 42 may develop high internal pressure such that the fueling operation may be hampered or even prevented. To relieve pressure in vehicle fuel tank 42 in the configuration illustrated in FIGS. 2 and 3 with a dispensing tank 50, the high pressure fluid from vehicle fuel tank 42 is returned to dispensing tank 50 in order to avoid mixing warm fluid with the cold liquefied natural gas in the primary bulk storage tank 10.

When dispensing tank 50 is being filled via mix fluid conduit 40 and the pressure in dispensing tank 50 is undesirably high, relatively cold liquefied natural gas may be sprayed into the vapor space 54 to reduce pressure. To accomplish this result, conduit 23 communicates with conduit 20 and with the vapor space 54. Conduit 23 includes a back pressure regulator 25 and a check valve 27. Regulator 25 opens when the pressure in dispensing tank 50 exceeds a predetermined set point. When the pressure in dispensing tank 50 rises above the setpoint, regulator 25 opens and cold liquefied natural gas is sprayed into the vapor space 54 until the pressure is maintained below the predetermined maximum pressure setpoint.

The setpoint of regulator 25 is preferably below the setpoint of the regulator 58 in conduit 56, when present. For example, for a system which is designed to nominally deliver −200° F. liquid methane (for which the saturation pressure is 100.6 psig), the setpoint of regulator 25 may be 115 psig and the setpoint of regulator 58 may be 125 psig. In operation, regulator 25 will open before regulator 58. If pump 22 is running, then cold liquid will flow through conduit 23 into dispensing tank 50 and lower the pressure in dispensing tank 50. If pump 22 is not running, there will be no flow in conduit 23 and the pressure in tank 50 will continue to rise due to ambient or other heat gain until regulator 58 opens.

In an alternate embodiment (not illustrated), the regulator 25 can be replaced by a valve that opens in response to a switch that senses the pressure in the dispensing tank 50.

Conduit 80 communicates upstream with the lower interior space of dispensing tank 50. The downstream end of conduit 80 communicates with conduit 66, and conduit 80 includes a pump 82 that withdraws liquefied natural gas from dispensing tank 50 and feeds it to conduit 66. Pump 82 may require a minimum circulation rate to avoid priming difficulties. Thus, when valve 71 is closed a minimal amount of liquefied natural gas recirculates to dispensing tank 50 via conduit 81. A flow restricting device such as an orifice is positioned in conduit 81 to allow flow through conduit 81 when valve 71 is closed but restricts flow through conduit 81 when valve 71 is open.

The downstream end of conduit 66 is provided with a hose 73 having a coupling 74 which can be removably connected to the outer end of fuel fill pipe 76 which communicates with the vehicle fuel tank 42. Liquefied natural gas at a temperature of about −238° F. to −126° F. and a pressure of about 20 psig to 550 psig can be withdrawn from dispensing tank 50 by means of conduit 80 by the pump 82 and fed through conduit 66 and to hose 73 which feeds the fuel into vehicle fuel tank 42 at such time as the bus 44 is to be refueled. After the fuel tank 42 is filled the hose 73 is uncoupled from pipe 76 and the end of pipe 76 is sealed by a cap, not shown.

Figure 3:
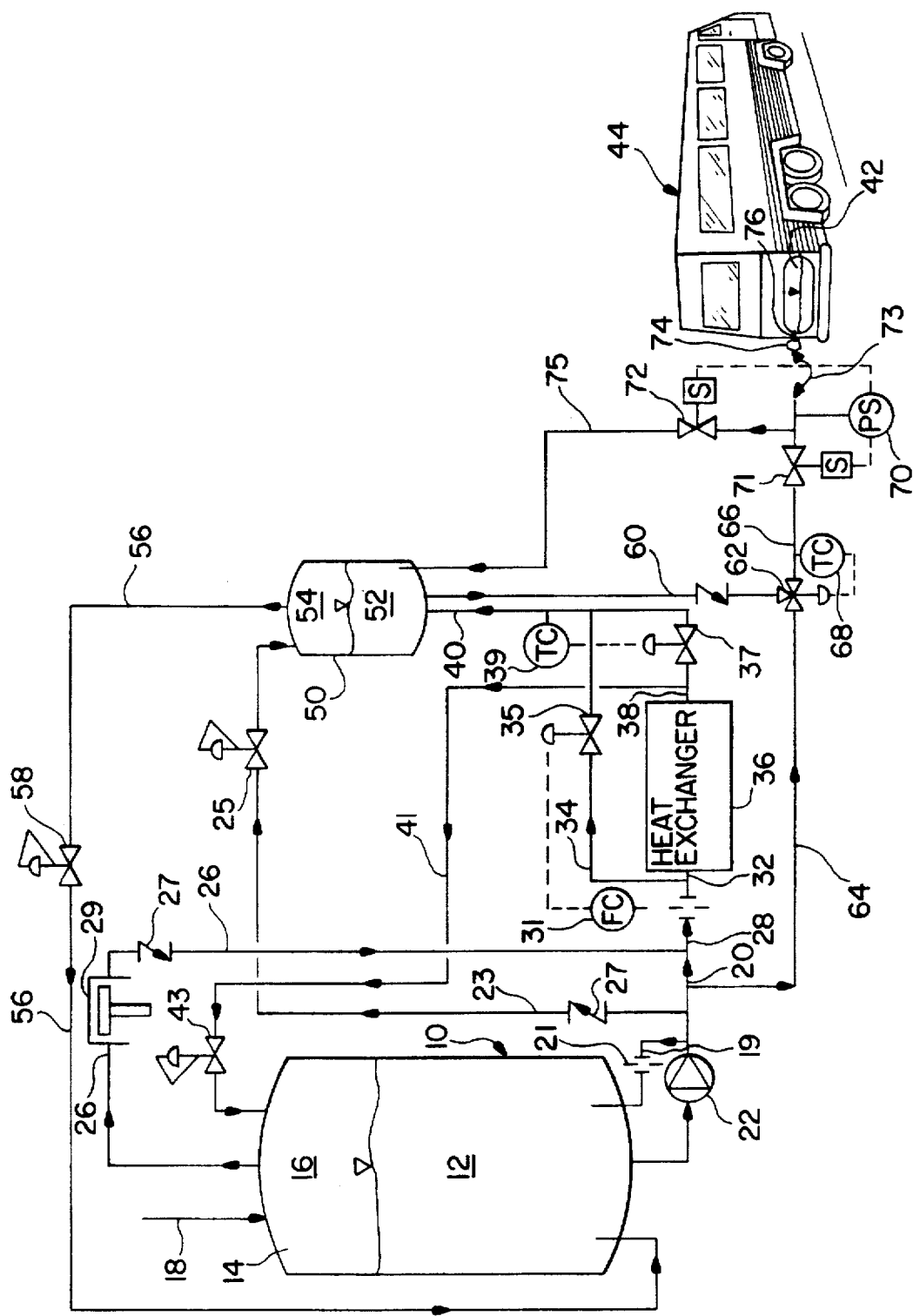
FIG. 3 diagrammatically illustrates a third embodiment of apparatus useful in practicing the invention.

The apparatus illustrated in FIG. 3 also permits an optional way to practice the invention. Thus, by means of conduit 64 relatively cold liquefied natural gas withdrawn from primary tank 10 can be fed into admixture in control valve 62 with the warmer liquefied natural gas supplied by conduit 60 to form a blend which can then be fed into vehicle fuel tank 42 at a temperature lower than the temperature of the liquid in the dispensing tank 50. In this manner the pressure in the dispensing tank 50 may be kept higher than the vehicle fuel tank pressure in order to provide the motive force necessary for dispensing the liquefied fuel and eliminate the need for pump 82. This is also desirable, at times, to compensate for the warming effect exerted by a substantially unused fuel tank 42 and also the heat which enters the fuel during the filling operation due to vapor condensation.

Liquefied natural gas exiting the control valve 62 is fed to conduit 66. The temperature of the liquefied natural gas stream flowing through conduit 66 is measured by temperature controller 68 which sends a signal to control valve 62 to properly proportion the amount of liquefied natural gas from conduit 60 and conduit 64 which is fed through the control valve 62. The amount of liquefied natural gas flowing through conduit 66 can be 0% to 100% from conduit 60 and 0% to 100% from conduit 64 depending on existing conditions.

Figure 4:
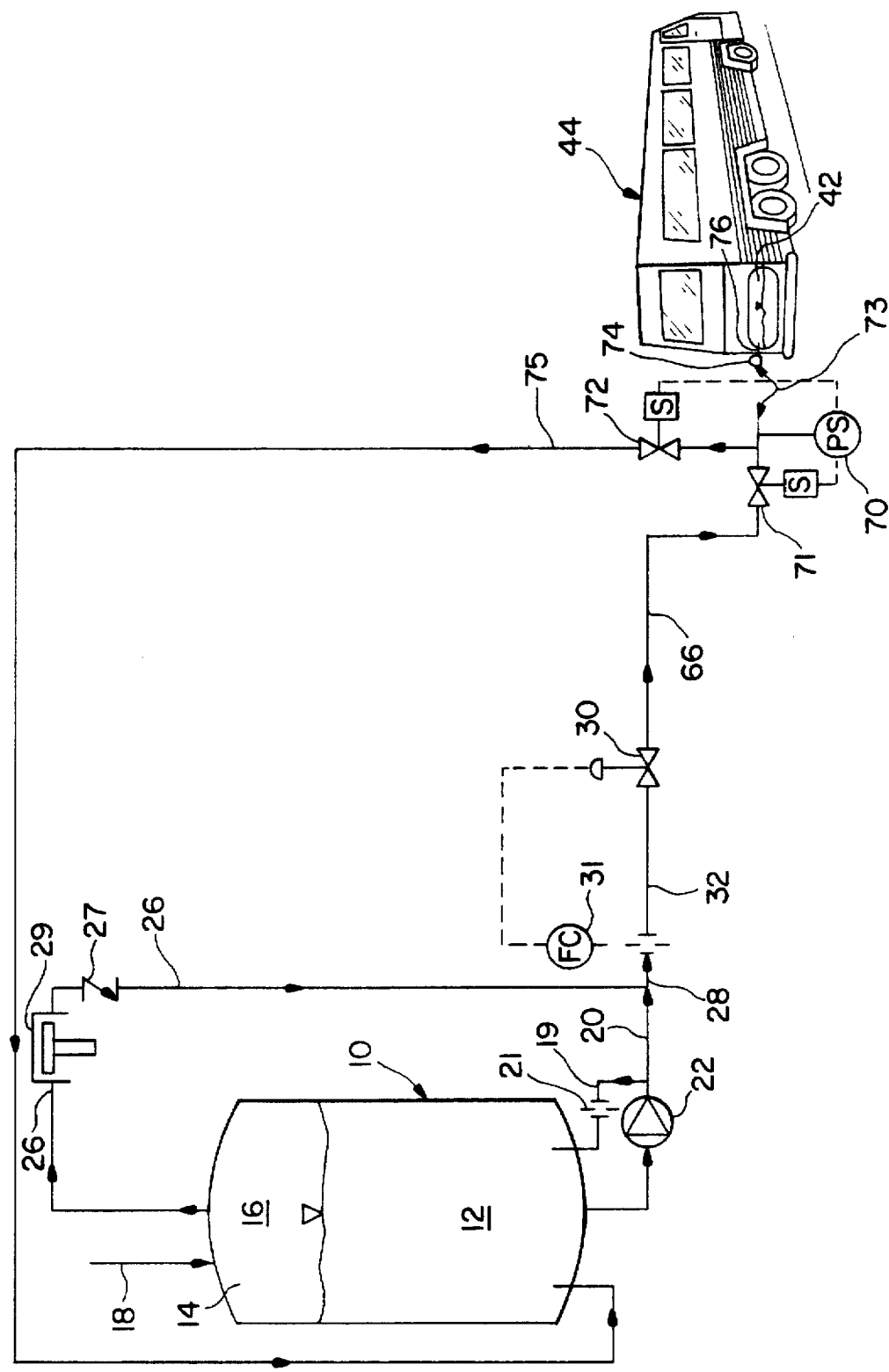
FIG. 4 diagrammatically illustrates a fourth embodiment of apparatus useful in practicing the invention.

The apparatus illustrated by FIG. 4 is very similar to that shown in FIG. 1. However, the apparatus of FIG. 4 does not include the indirect heat exchanger 36 forming part of the apparatus illustrated in FIGS. 1 through 3.

With reference to FIG. 4, the natural gas vapor which accumulates in vapor space 16 is withdrawn therefrom through conduit 26 and fed to conduit 28 which feeds it to conduit 32 through a flow controller 31. The liquefied natural gas stream is delivered by conduit 28 where the vapor from conduit 26 is condensed by direct contact with the liquefied natural gas which is thereby warmed. The warmed liquefied natural gas stream is fed from control valve 30 to conduit 66 and by it to hose 73 for delivery to vehicle tank 42. The flow rate of the liquefied natural gas fed through conduit 66 is controlled by flow controller 31 which regulates control valve 30. The amount of liquefied natural gas fed to conduit 38 relative to vapor supplied by conduit 26 regulates the temperature in conduit 32 and is controlled by the duration of compressor 29 operation.

Figure 5:
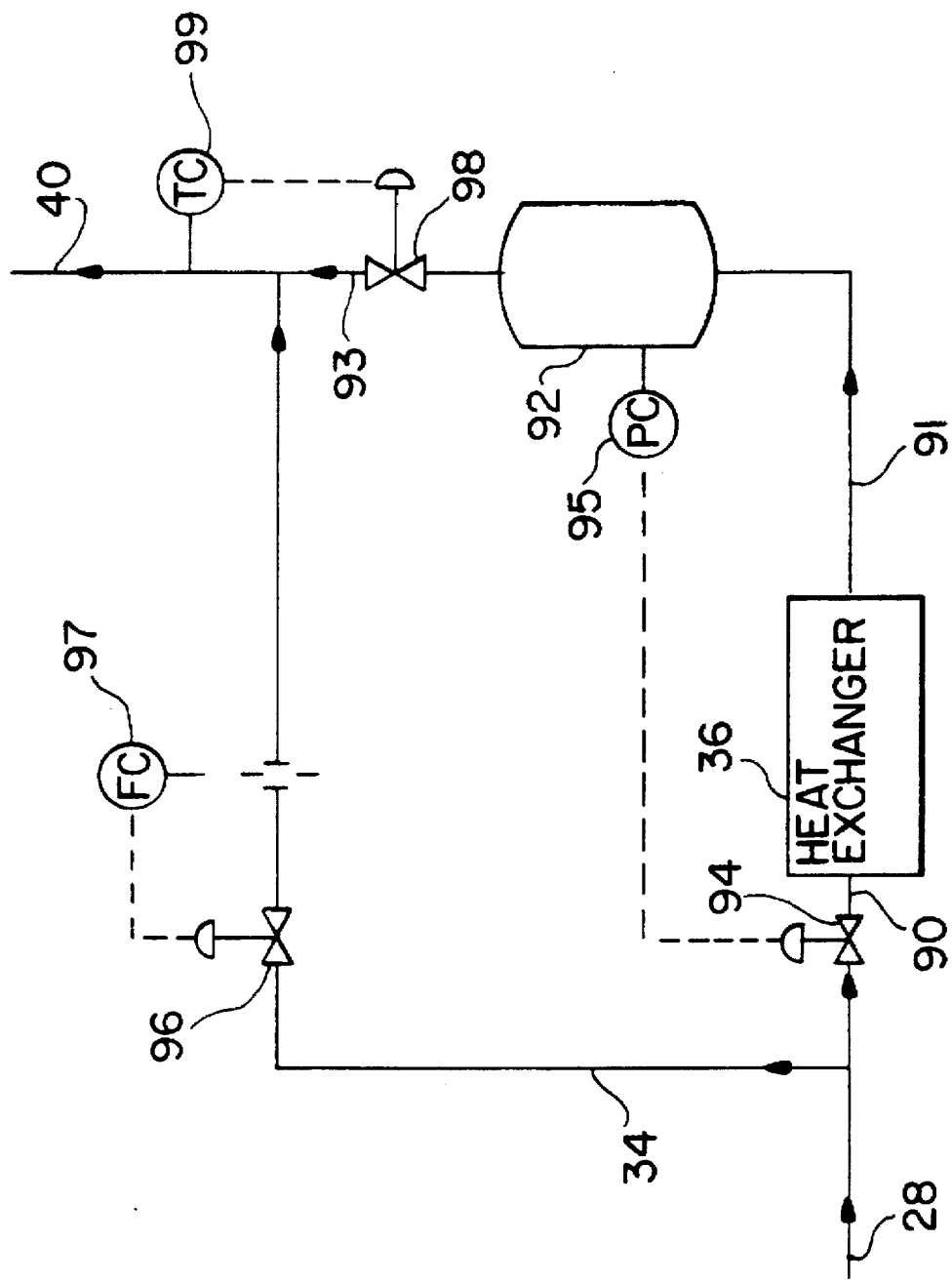
FIG. 5 diagrammatically illustrates a heat exchanger, gas reservoir, and by-pass conduit, useful in practicing the invention.

Illustrated in FIG. 5 is an alternate embodiment of an apparatus for developing a mixed stream of warmed and pressurized liquefied natural gas for storage in dispensing tank 50 or direct feeding to vehicle fuel tank 42. Conduit 28 feeds pressurized liquefied natural gas 12 from pump 22 to the heat exchanger 36 and to conduit 34. Heat exchanger 36 is of sufficient thermal capacity to ensure the liquid entering the heat exchanger 32 boils to become natural gas and that the outlet temperature approaches that of the heat source. For example, if heat exchanger 36 is a natural air draft finned tube heat exchanger, then the outlet temperature of the gas in line 91 should be close to ambient temperature with an approximately known enthalpy for a given pressure.

Reservoir 92 is located on the discharge of heat exchanger 36 and is of sufficient size that rapid changes in discharge from reservoir 92 do not appreciably affect the pressure within reservoir 92. The pressure in reservoir 92 is maintained by pressure controller 95 regulating the valve 94 which restricts flow into heat exchanger 36. The liquid flow rate in liquid conduit 34 is controlled by flow controller 97 and regulating valve 96. The temperature in outlet conduit 40 is controlled directly by temperature controller 99 regulating the gas flow valve 98 included in vapor conduit 93.

In particular, it is desirable that the absolute pressure in vessel 92 be approximately 50% greater than the absolute pressure in conduit 40 so that the flow in valve 98 approaches a choked flow condition. In this manner the mass flow in vapor conduit 93 is essentially predetermined for a given position of valve 98.

Figure 6:
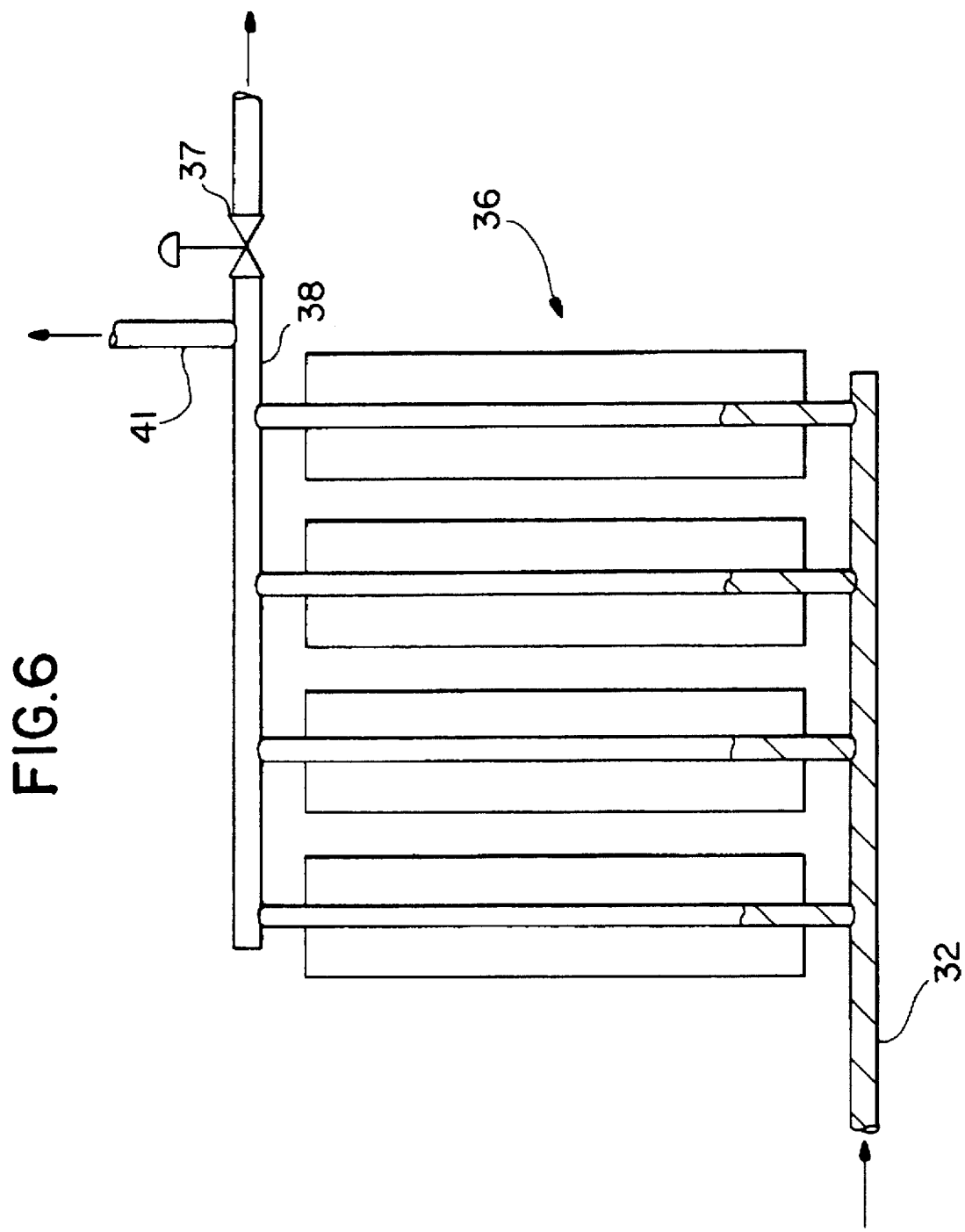
FIG. 6 illustrates a manifold heat exchanger useful in practicing the invention.

FIG. 6 illustrates a particular heat exchanger 36 configuration having a continuous horizontal bottom inlet and a horizontal top outlet manifold for use in the present invention as opposed to a conventional serpentine tube configuration. Conduits 32 and 38 serve essentially the same functions as described above with respect to FIGS. 1, 2 and 3 in addition to acting as the horizontal manifolds in the illustrated heat exchanger. Cold liquid is fed by pump 22 to line 32 and under steady conditions establishes a boiling liquid level in the vertical tubes of the heat exchanger 36. When tank 42 or 50 has been filled and the transfer process is complete, valve 37 closes and some residual liquid remains in the bottom manifold 32 and in the lower portions of the vertical tubes. This residual liquid will continue to absorb heat from the environment causing it to evaporate in part. Because valve 37 is closed, pressure in the heat exchanger 36 will rise allowing some liquid to be pushed out of the bottom manifold 32 and back upstream toward primary tank 10. Once the heat exchanger 36 has been "drained" of liquid in this manner, the temperature of the vapor trapped within the heat exchanger 36 will approach ambient temperature and further heat gain to the system will be minimized.

Figure 7:
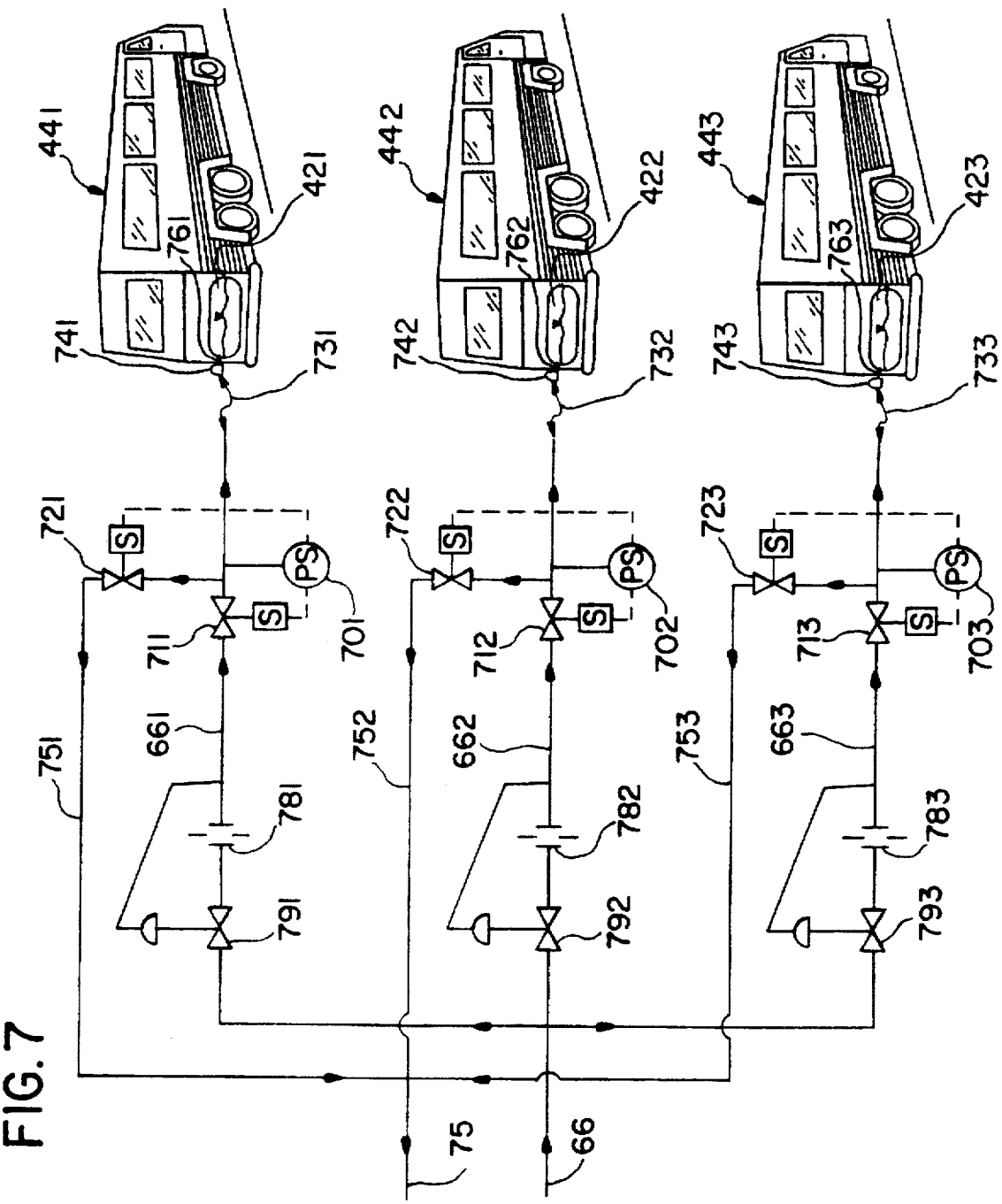
FIG. 7 diagrammatically illustrates an embodiment of a fueling station useful for practicing the invention.

FIG. 7 illustrates the present invention with a number of dispensing stations. The flow rate to each vehicle need not be exactly the same but should be approximately equal because it is desirable to employ one or two large capacity pumps in the system rather than many small capacity pumps (each dedicated to a single vehicle) in order to minimize capital costs and wear on the pumps due to frequent starts. Thus, an economical means to regulate the flow from one or two pumps to a number of different vehicles is desirable. This can be accomplished by regulating the flow through each hose at a fueling station in response to a pressure drop induced by a flow restriction upstream of each hose. There will be a nominal pressure drop associated with normal flow rate. Observed pressure drops greater than or less than the nominal pressure drop will indicate flows greater than or less than the nominal flow rate, respectively.

As shown in FIG. 7, conduits 66 and 75 remain essentially the same as shown in FIGS. 1 through 4 except that they are now branched to serve each of the three stations equally. Item nos. 42, 70, 71, 72, 73 and 74 are now shown in triplicate with a suffix 1, 2 or 3 for each respective dispensing station. All of these items serve essentially the same function at each station.

A flow restrictor 781 is included in conduit 661 upstream of regulator 711 and hose 731. A spring-actuated differential pressure regulator 791 with an external spring chamber connection, modulates its opening position in response to the differential pressure which occurs across restrictor 781. Regulator 791 tends to close and restrict flow if an abnormally high flow across restrictor 781 induces a pressure drop above the setpoint of regulator 791. The higher initial flow rate may occur if the pressure in vehicle fuel tank 421 is abnormally low. Differential pressure regulator 791 can be a unit such as the 95 Series or 98 Series sold by Fisher Controls Company of Marshalltown, Iowa. Duplicative regulators 792, 793 and restrictors 782, 783 are shown for hoses 732, 733, respectively. Further, flow restrictors 781, 782 and 783 can be either upstream or downstream of their respective regulators 791, 792 and 793, depending on the regulator's design.

Regulators 791, 792 and 793 can be gage pressure regulators (as opposed to differential pressure regulators) if the supply pressure is relatively fixed; i.e. the flow restrictor can be upstream of an inlet pressure regulator. However, the use of a differential pressure regulator as illustrated in FIG. 7 is preferred because it operates essentially independently of supply pressure.

In the subsequent examples the composition of LNG has been assumed to be essentially 100% methane to simplify the determination of thermodynamic points.

EXAMPLE 1

A transit bus 44 stores liquefied natural gas on-board in an insulated vehicle tank 42. Fuel is removed from the vehicle tank and fed to a fuel injected internal combustion engine. Proper operation of the engine requires a pressure of 100 psig in the vehicle tank (the corresponding saturation temperature is approximately −200° F.).

At the bus fuel filling station, liquefied natural gas is stored in a large bulk storage or primary tank 10 at 30 psig (its corresponding saturation temperature is approximately −231° F.). If the vehicle tank 42 is filled with −231° F. liquid directly from the bulk storage tank, the pressure in the vehicle tank 42 will drop significantly below 100 psig, and the bus engine will not properly operate.

The bus 44 has been parked for some time, and heat transfer from the atmosphere has caused the liquefied natural gas in the tank 42 to warm from −200° F. to −194° F. and the tank pressure to rise from about 100 psig to about 120 psig.

In one example of the embodiment shown in FIG. 1, liquefied natural gas is withdrawn from the bulk storage or primary tank 10 by means of conduit 20 at the saturation temperature of −231° F. and is increased in pressure by pump 22 to 140 psig. From pump 22 the cold stream flows through conduits 20, 28 and 32. If compressor 29 is running, the cold liquefied natural gas stream condenses excess vapor from tank 10 supplied by conduit 26 to conduit 20 and then flows into heat exchanger 36, wherein it is heated in a controlled manner such that the mixed outlet temperature in conduit 66 is −200° F. The liquefied natural gas supply pressure of 140 psig overcomes the vehicle tank back pressure of 120 psig, plus the pressure drop in heat exchanger 36 and conduits 20, 38, and 66 in order to establish flow to the vehicle tank. If the vehicle fuel tank 42 back pressure is excessive, it will first be vented back to primary tank 10 through conduit 75. Further, pressure regulator 33 has a setpoint of 20 psig and if the pressure in primary tank 10 drops below 20 psig as sensed by pressure regulator 33, the pressure will be raised by the introduction of warmed and pressurized liquefied natural gas via conduit 41. The bus vehicle tank is thus filled with −200° F. liquefied natural gas and it maintains an operating pressure of near 100 psig at the conclusion of the filling sequence, allowing the bus engine to be started and the bus driven away.

EXAMPLE 2

As illustrated in FIG. 2, a quantity of liquid natural gas has been previously removed from primary tank 10 via pump 22, heated in a controlled manner to −200° F. via line 28, heat exchanger 36, and temperature controller 39, and stored in dispensing vessel 50.

The setpoint of pressure regulator 25 is 107 psig (the corresponding saturation temperature is −198° F.). If the pressure in dispensing tank 50 exceeds 107 psig while dispensing tank 50 is being filled because of ambient heat transfer or the latent heat duty of vapor condensation within the tank, then regulator 25 opens and allows cold liquid to enter dispensing tank 50 and thereby limits the pressure in dispensing tank 50 to 107 psig. Therefore, the temperature of the liquid in dispensing tank 50 will be within the controlled temperature range of −200° F. feed temperature and the −198° F. saturation temperature at 107 psig.

Regulator 43 limits the minimum pressure in primary tank 10. The setpoint of pressure regulator 43 is 20 psig. If the pressure in primary tank 10 drops from 30 psig to less than 20 psig as liquid is removed from it, then regulator 43 opens in order to maintain the pressure in primary tank 10 to at least 20 psig.

Conversely, compressor 29 limits the maximum pressure in primary tank 10 and is typically most advantageous during periods of low facility use. The setpoint to start operation of compressor 29 is 70 psig. If when vessel 50 is being filled with liquid the pressure in primary tank 10 is 70 psig or higher, then compressor 29 runs in order to withdraw vapor from primary tank 10 and auto refrigerate is contents.

Consider the scenario wherein the dispensing apparatus of FIG. 2 is unused for an extended period of time before a bus arrives to be filled. Atmospheric heat gain into dispensing tank 50 will cause its temperature to rise. The setpoint of pressure regulator 58 is 120 psig (the corresponding saturation temperature is −194° F.). When its temperature exceeds −194° F., its corresponding saturation pressure will exceed 120 psig, and regulator 58 will open to restrict the pressure in dispensing tank 50 to 120 psig and the liquid temperature to −194° F. In this scenario regulator 25 will have opened, but no flow from line 23 will have entered tank 50 because pump 22 is stopped.

Now consider that the bus 44 arrives to be filled with LNG shortly after dispensing tank 50 has been filled. The bus 44 has just returned from regular operation and the pressure in vehicle fuel tank 42 is 100 psig. The pressure in dispensing tank 50 is 107 psig and the temperature of the liquid 52 in tank 50 is −198° F. Pump 82 is running and liquid is flowing through the recirculation conduit 81 but valve 71 is closed and there is no flow in conduit 66. Valve 72 is also closed. The maximum differential pressure developed by pump 82 is 40 psi. Hose 73 is then connected to vehicle fuel tank 42 via connectable coupling 74, whereupon the pressure in hose 73 equates with the pressure in vehicle fuel tank 42 of 100 psig. The pressure switch 70 has a setpoint of 120 psig. Since the pressure which is sensed (100 psig) is less than the switch 70 setpoint (120 psig), valve 71 is open and valve 72 is closed. LNG at −198° F. and 105+40=145 psig (less frictional losses) flows immediately through line 66 into vehicle fuel tank 42.

Consider again that the bus arrives to be filled shortly after dispensing tank 50 has been filled, but instead that the bus 44 had been parked for an extended period of time. Atmospheric heat gain to vehicle fuel tank 42 caused the liquid within the vehicle fuel tank 42 to increase in temperature to −186° F., and the pressure in vehicle fuel tank 42 corresponds to the saturation pressure of 150 psig. Pressure switch 70 will sense a pressure (150 psig) higher than its setpoint (120 psig) when hose 73 is connected to dispensing tank 42. In this case, valve 72 will open (valve 71 will remain closed) and vapor will flow from vehicle fuel tank 42 to dispensing tank 50 for such time until the pressure in vehicle fuel tank 42 drops to the switch setpoint (120 psig), whereupon valve 72 will close and valve 71 will open allowing LNG to flow into vehicle fuel tank 42 from dispensing tank 50. The LNG in dispensing tank 50 will have been warmed slightly by the addition of the gas from conduit 75 but this is not disadvantageous for infrequent occurrences.

EXAMPLE 3

In one example of the embodiment shown in FIG. 3, liquefied natural gas is withdrawn from the bulk storage tank 10 at the saturation temperature of −231° F. and at 30 psig and increased in pressure by pump 22 to 140 psig. The subcooled liquefied natural gas condenses excess vapor from tank 10 flowing in conduit 26 in conduit 20. The liquefied natural gas flows by means of conduits 28 and 32 into heat exchanger 36 wherein it is heated in a controlled manner in conduit 40 to near its saturation temperature of −189° F., such that vapor and liquid are in saturation equilibrium 140 psig in vessel 50. Warm liquefied natural gas at 140 psig and about −189° F. in conduit 60 is mixed with cold liquefied natural gas at 140 psig and −231° F. from conduit 64 in control valve 62 to produce liquefied natural gas at 140 psig and −200° F. When dispensing tank pressure is excessively high, as sensed by regulator 25, cold pressurized liquefied natural gas is sprayed into vapor space 50 via conduit 23. High pressure fluid from vehicle fuel tank 42 is fed to dispensing tank 50. The liquefied natural gas supply pressure of 140 psig overcomes the vehicle tank back pressure of 120 psig plus the pressure drop due to conduits 60,64 to establish flow, so that the bus can be filled with −200° F. liquefied natural gas while maintaining an operating pressure near 100 psig, permitting the bus to be driven away.

What is claimed is:

1. Apparatus comprising:
   (a) a primary insulated storage tank containing liquefied cryogenic fuel at a low pressure and at a temperature close to its boiling point;
   (b) a heat exchanger;
   (c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmer to a subcooled or near saturated condition; and
   (d) a second conduit communicating with the heat exchanger and having means for communicating with a vehicle fuel tank, the second conduit for receiving warmed and pressurized liquefied cryogenic fuel from the heat exchanger and feeding it to a vehicle fuel tank for storage as a liquid therein at an approximate saturated condition
   (e) a third conduit communicating with the primary tank and having means for communicating with a vehicle fuel tank, the third conduit for receiving fluid from the vehicle fuel tank and feeding it to the primary tank to reduce the internal pressure of the vehicle fuel tank.

2. Apparatus comprising:
   (a) a primary insulated storage tank containing liquefied cryogenic fuel at a low pressure and at a temperature close to its boiling point;
   (b) a heat exchanger;
   (c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmed to a subcooled or near saturated condition; and
   (d) a second conduit communicating with the heat exchanger and having means for communicating with a vehicle fuel tank, the second conduit for receiving warmed and pressurized liquefied cryogenic fuel from the heat exchanger and feeding it to a vehicle fuel tank for storage as a liquid therein at an approximate saturated condition; and
   a third conduit communicating with the heat exchanger and the primary tank, the third conduit for receiving the warmed and pressurized liquefied cryogenic fuel from the heat exchanger and feeding it to the primary tank to maintain the pressure in the primary tank above a predetermined minimum pressure.

3. Apparatus comprising:
   (a) a primary insulated storage tank containing liquefied cryogenic fuel at a low pressure and at a temperature close to its boiling point;
   (b) a heat exchanger;
   (c) a first conduit communicating with the primary tank and with the heat exchanger, the first conduit including a pump for withdrawing liquefied cryogenic fuel from the primary tank, increasing the pressure of the withdrawn liquefied cryogenic fuel and feeding it through a control valve to the heat exchanger wherein the pressurized liquefied cryogenic fuel is converted to pressurized cryogenic fuel vapor at a temperature approaching that of a heat source for the heat exchanger;
   (d) a reservoir in vapor communication with said heat exchanger for receiving and storing warmed and pressurized cryogenic fuel vapor;
   (e) a second conduit having means for transferring warmed and pressurized liquefied cryogenic fuel to a vehicle fuel tank at a subcooled or near saturated condition;

(f) a liquid conduit communicating with the first conduit downstream of the pump and with the second conduit, the liquid conduit including a control valve for receiving and controlling the flow of pressurized liquefied cryogenic fuel from the first conduit to the second conduit; and (g) a vapor conduit communicating with the reservoir and the second conduit, the vapor conduit including a control valve for controlling the flow of warmed and pressurized cryogenic fuel from the reservoir to the second conduit for mixture with the pressurized liquefied cryogenic fuel to form a warmed and pressurized liquefied cryogenic fuel in the second conduit at an approximate saturated condition.

4. Apparatus comprising:

(a) a primary insulated storage tank containing liquefied cryogenic fuel at a low pressure and at a temperature close to its boiling point;

(b) a heat exchanger;

(c) a first conduit communicating with the liquefied cryogenic fuel in the primary tank and with the heat exchanger, the first conduit including a pump for withdrawing liquefied cryogenic fuel from the primary tank, increasing the pressure of the withdrawn liquefied cryogenic fuel and feeding it to the heat exchanger wherein the pressurized liquefied cryogenic fuel is warmed to a subcooled or near saturated condition;

(d) a plurality of fueling conduits communicating with the heat exchanger and each fueling conduit having means for communicating with a vehicle fuel tank, the fueling conduits each including a flow restrictor for controlling the flow of warmed and pressurized liquefied cryogenic fuel from the heat exchanger to a vehicle fuel tank for storage therein as a liquid therein at a subcooled or an approximate saturated condition; and (e) a plurality of mechanical regulators, each regulator having means for sensing fluid flow pressure drop across one of the flow restrictors and means for reducing the flow of warmed and pressurized liquefied cryogenic fuel to a vehicle fuel tank in response to high fluid flow pressure drop in a restrictor to maintain a relatively uniform pressure drop across each of the flow restrictors.

5. Apparatus comprising:

(a) a primary insulated storage tank containing liquefied cryogenic fuel at a low pressure and at a temperature close to its boiling point;

(b) a heat exchange;

(c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmed;

(d) a stationary cryogenic fuel dispensing tank;

(e) a second conduit for feeding the warmed and pressurized liquefied cryogenic fuel from the heat exchanger to the stationary dispensing tank for storage in the dispensing tank at an approximate saturated condition; and (f) a third conduit communicating with the dispensing tank and having means for communicating with a vehicle fuel tank, the third conduit for receiving warmed and pressurized liquefied cryogenic fuel from the dispensing tank and feeding it to a vehicle fuel tank for storage therein at an approximate saturated condition and the third conduit includes a pump.

6. Apparatus comprising:

(a) a primary insulated storage tank containing liquefied cryogenic fuel at a low pressure and at a temperature close to its boiling point;

(b) a heat exchanger;

(c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmed;

(d) a stationary cryogenic fuel dispensing tank;

(e) a second conduit for feeding the warmed and pressurized liquefied cryogenic fuel from the heat exchanger to the stationary dispensing tank for storage in the dispensing tank at an approximate saturated condition;

(f) a third conduit communicating with the dispensing tank and having means for communicating with a vehicle fuel tank, the third conduit for receiving warmed and pressurized liquefied cryogenic fuel from the dispensing tank and feeding it to a vehicle fuel tank for storage therein at an approximate saturated condition, the third conduit includes a temperature control valve; and (g) a fourth conduit in communication with the first conduit downstream of the pump and with the temperature control valve, the fourth conduit for receiving pressurized liquefied cryogenic fuel from the first conduit and feeding it to the temperature control valve for mixture with warmed and pressurized liquefied cryogenic fuel in the third conduit.

7. Apparatus comprising:

(a) a primary insulated storage tank containing liquefied cryogenic fuel at a low pressure and at a temperature close to its boiling point;

(b) a heat exchanger;

(c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmed;

(d) a stationary cryogenic fuel dispensing tank;

(e) a second conduit for feeding the warmed and pressurized liquefied cryogenic fuel from the heat exchanger to the stationary dispensing tank for storage in the dispensing tank at an approximate saturated condition;

(f) a third conduit communicating with the dispensing tank and having means for communicating with a vehicle fuel tank, the third conduit for receiving warmed and pressurized liquefied cryogenic fuel from the dispensing tank and feeding it to a vehicle fuel tank for storage therein at an approximate saturated condition; and (g) a fourth conduit communicating with the primary tank and having means for communicating with the vehicle fuel tank, the fourth conduit for receiving fluid from the vehicle fuel tank and returning it to the primary tank to reduce the internal pressure of the vehicle fuel tank.

8. Apparatus comprising:

(a) a primary insulated storage tank containing liquefied cryogenic fuel at a low pressure and at a temperature close to its boiling point;

(b) a heat exchanger;

(c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmed;

(d) a stationary cryogenic fuel dispensing tank;

(e) a second conduit for feeding the warmed and pressurized liquefied cryogenic fuel from the heat exchanger to the stationary dispensing tank for storage in the dispensing tank at an approximate saturated condition;

(f) a third conduit communicating with the dispensing tank and having means for communicating with a vehicle fuel tank, the third conduit for receiving warmed and pressurized liquefied cryogenic fuel from the dispensing tank and feeding it to a vehicle fuel tank for storage therein at an approximate saturated condition; and (g) a fourth conduit communicating with the dispensing tank and having means for communicating with the vehicle fuel tank, the fourth conduit for receiving fluid from the vehicle and returning it to the dispensing tank to reduce the internal pressure of the vehicle fuel tank.

9. Apparatus comprising:

(a) a primary insulated storage tank containing liquefied cryogenic fuel at a low pressure and at a temperature close to its boiling point;

(b) a heat exchanger;

(c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the presssurized liquefied cryogenic fuel is warmed;

(d) a stationary cryogenic fuel dispensing tank;

a second conduit for feeding the warmed and pressurized liquefied cryogenic fuel from the heat exchanger to the stationary dispensing tank for storage in the dispensing tank at an approximate saturated condition;

(f) a third conduit communicating with the dispensing tank and having means for communicating with a vehicle fuel tank, the third conduit for receiving warmed and pressurized liquefied cryogenic fuel from the dispensing tank and feeding it to a vehicle fuel tank for storage therein at an approximate saturated condition; and (g) a fourth conduit communicating with the heat exchanger and the primary insulated tank, the fourth conduit for receiving the warmed and pressurized liquefied cryogenic fuel from the heat exchanger and feeding it to the primary insulated tank as needed for maintaining the pressure in the primary storage tank above a predetermined minimum pressure.

10. Apparatus comprising:

(a) a primary insulated storage tank containing liquefied cryogenic fuel at a low pressure and at a temperature close to its boiling point;

(b) a heat exchanger;

(c) a first conduit communicating with the primary storage tank and with the heat exchanger, the first conduit including a pump for withdrawing liquefied cryogenic fuel from the primary storage tank, increasing the pressure of the withdrawn liquefied cryogenic fuel and feeding it to the heat exchanger wherein the pressurized liquefied cryogenic fuel is warmed;

(d) a stationary cryogenic fuel dispensing tank defining a vapor space therein;

(e) a second conduit for feeding the warmed and pressurized liquefied cryogenic fuel from the heat exchanger to the stationary dispensing tank for storage in the dispensing tank at an approximate saturated condition;

(f) a third conduit communicating with the dispensing tank and having means for communicating with a vehicle fuel tank, the third conduit for receiving warmed and pressurized liquefied cryogenic fuel from the dispensing tank and feeding it to a vehicle fuel tank for storage therein at an approximate saturated condition; and (g) a fourth conduit communicating with the first conduit downstream of the pump and with the vapor space in the dispensing tank, the fourth conduit for receiving pressurized liquefied cryogenic fuel from the first conduit and feeding it to the vapor space in the dispensing tank to maintain the pressure in the dispensing tank below a predetermined maximum pressure.

11. Apparatus comprising:

(a) a primary insulated storage tank containing liquefied cryogenic fuel at a low pressure and at a temperature close to its boiling point;

(b) a heat exchanger;

(c) a first conduit communicating with the primary tank and with the heat exchanger, the first conduit including a pump for withdrawing liquefied cryogenic fuel from the primary tank, increasing the pressure of the withdrawn liquefied cryogenic fuel and feeding it through a control valve to the heat exchanger wherein the pressurized liquefied cryogenic fuel is converted to pressurized and vaporized cryogenic fuel near at a temperature approaching that of a heat source for the heat exchanger;

(d) a reservoir in vapor communication with the heat exchanger having means for receiving and storing pressurized and cryogenic fuel vapor from the heat exchanger;

(e) stationary insulated dispensing tank having means for receiving and storing warmed and pressurized liquefied cryogenic fuel at an approximate saturated condition;

(f) a liquid conduit communicating with the first conduit downstream from the pump and with the dispensing tank, the liquid conduit including a control valve for receiving and controlling the flow of pressurized liquefied cryogenic fuel from the first conduit to the dispensing tank;

(g) a vapor conduit communicating with the reservoir and the dispensing tank, the vapor conduit including a control valve for controlling the flow of pressurized and vaporized cryogenic fuel from the reservoir to the dispensing tank for mixture with pressurized liquefied cryogenic fuel to form a pressurized liquefied cryogenic fuel at an approximate saturated condition; and (h) a second conduit communicating with the dispensing tank and having means for feeding warmed and pressurized liquefied cryogenic fuel from the dispensing tank to a vehicle fuel tank.

12. Apparatus comprising:

(a) a primary insulated storage tank containing liquefied cryogenic fuel at a low pressure and at a temperature close to its boiling point;

(b) a heat exchanger;

(c) a first conduit communicating with the primary storage tank and with the heat exchanger, the first conduit including a pump for withdrawing liquefied cryogenic fuel from the primary storage tank, increasing the pressure of the withdrawing liquefied cryogenic fuel and feeding it to the heat exchanger wherein the pressurized liquefied cryogenic fuel is warmed;

(d) a stationary cryogenic fuel dispensing tank;

(e) a second conduit for feeding the warmed and pressurized liquefied cryogenic fuel from the heat exchanger to the stationary dispensing tank for storage in the dispensing tank at an approximate saturated condition;

(f) a plurality of fueling conduits communicating with the dispensing tank and each fueling conduit having means for communicating with a vehicle fuel tank, the fueling conduits each including a flow restrictor for controlling the flow of warmed and pressurized liquefied cryogenic fuel from the dispensing tank and feeding it to a vehicle fuel tank for storage therein at an approximate saturated condition; and (g) a plurality of mechanical regulators, each regulator having means for sensing fluid flow pressure drop across one of the flow restrictors and means for reducing the flow of warmed and pressurized liquefied cryogenic fuel to a vehicle fuel tank in response to excessively high fluid flow drop in a restrictor to maintain a relatively uniform pressure drop across each of the flow restrictors.

13. The apparatus of claim 12 and further comprising:

(h) a second pump for withdrawing warmed liquefied cryogenic fuel from the dispensing tank and feeding it to the fueling conduits.

14. Apparatus comprising:

(a) a primary insulated storage tank containing liquefied cryogenic fuel at a low pressure and at a temperature close to its boiling point and including a vapor space containing cryogenic fuel;

(b) a first conduit communicating with the primary storage tank and having means for communicating with a vehicle fuel tank, the first conduit including a pump for withdrawing liquefied cryogenic fuel from the primary storage tank, increasing the pressure of the withdrawn liquefied cryogenic fuel, and feeding it to a vehicle fuel tank;

(c) a second conduit communicating with the vapor space in the primary storage tank and with the first conduit downstream of the pump, the second conduit including a compressor for withdrawing cryogenic fuel from the vapor space, increasing the pressure of cryogenic fuel and feeding it to the first conduit for mixture with the pressurized liquefied cryogenic fuel to form a warmed and pressurized liquefied cryogenic fuel that is at a subcooled or near saturated condition; and (d) a third conduit communicating with the primary tank and having means for communicating with a vehicle fuel tank, the third conduit for receiving fluid from the vehicle fuel tank and feeding it to the primary tank to reduce the internal pressure of the vehicle fuel tank.

15. A method comprising:

(a) withdrawing liquefied cryogenic fuel from a primary insulated storage tank at a low pressure and at a temperature close to its boiling point;

(b) increasing the pressure of the withdrawn liquefied cryogenic fuel and then feeding the pressurized liquefied cryogenic fuel through a heat exchanger to warm the liquefied cryogenic fuel to a subcooled or near saturated liquid condition;

(c) reducing the internal pressure of an insulated vehicle fuel tank by allowing fluid to flow from the vehicle fuel tank to the primary insulated storage tank, the vehicle fuel tank being adapted to safely contain and store the liquefied cryogenic fuel in liquid form at an approximate saturated condition; and (d) feeding the warmed and pressurized liquefied cryogenic fuel to the vehicle fuel tank.

16. A method comprising:

(a) withdrawing liquefied cryogenic fuel from a primary insulated storage tank at a low pressure and at a temperature close to its boiling point;

(b) increasing the pressure of the withdrawn liquefied cryogenic fuel and then feeding the pressurized liquefied cryogenic fuel through a heat exchanger to warm the liquefied cryogenic fuel to a subcooled or near saturated liquid condition;

(c) feeding the warmed and pressurized liquefied cryogenic fuel to a vehicle fuel tank, the vehicle fuel tank being adapted to safely contain and store the said liquefied cryogenic fuel in liquid form, at an approximate saturated condition; and (d) feeding warmed and pressurized liquefied cryogenic fuel from the heat exchanger to the primary tank to maintain the pressure in the primary tank above a predetermined minimum pressure.

17. A method comprising:

(a) withdrawing liquefied cryogenic fuel from a primary insulated storage tank at a low pressure and at a temperature close to its boiling point;

(b) increasing the pressure of the withdrawn liquefied cryogenic fuel and then feeding the pressurized liquefied cryogenic fuel through a heat exchanger to warm the liquefied cryogenic fuel to a subcooled or near saturated liquid condition;

(c) feeding the warmed and pressurized liquefied cryogenic fuel through a plurality of restrictors, each restrictor communicating with a different vehicle fuel tank;

(d) sensing pressure drop across the restrictors; and (e) maintaining a predetermined pressure drop across each of the restrictors.

18. A method comprising:

(a) withdrawing liquefied cryogenic fuel from a primary insulated storage tank at a low pressure and at a temperature close to its boiling point;

(b) increasing the pressure of the withdrawn liquefied cryogenic fuel and then feeding the pressurized liquefied cryogenic fuel through a heat exchanger to warm the liquefied cryogenic fuel to a near saturated liquid condition;

(c) feeding the warmed and pressurized liquefied cryogenic fuel from the heat exchanger to a stationary insulated cryogenic fuel dispensing tank located at a vehicle liquefied cryogenic fuel dispensing facility and storing the liquefied cryogenic fuel in the dispensing tank in an approximate saturated condition;

(d) reducing the internal pressure of a vehicle fuel tank by allowing fluid to flow from the vehicle fuel tank to the primary insulated storage tank, the vehicle fuel tank being adapted to safely contain and store the liquefied cryogenic fuel in liquid form at an approximate saturated condition; and (e) feeding the warmed and pressurized liquefied cryogenic fuel to the vehicle fuel tank.

19. A method comprising:
(a) withdrawing liquefied cryogenic fuel from a primary insulated storage tank at a low pressure and at a temperature close to its boiling point;
(b) increasing the pressure of the withdrawn liquefied cryogenic fuel and then feeding the pressurized liquefied cryogenic fuel through a heat exchanger to warm the liquefied cryogenic fuel to a near saturated liquid condition;
(c) feeding the warmed and pressurized liquefied cryogenic fuel from the heat exchanger to a stationary insulated cryogenic fuel dispensing tank located at a vehicle liquefied cryogenic fuel dispensing facility and storing the liquefied cryogenic fuel in the dispensing tank in an approximate saturated condition;
(d) reducing the internal pressure of a vehicle fuel tank by allowing fluid to flow from the vehicle fuel tank to the dispensing tank, the vehicle fuel tank being adapted to safely contain and store the liquefied cryogenic fuel in liquid form at an approximate saturated condition; and
(e) feeding the warmed and pressurized liquefied cryogenic fuel to the vehicle fuel tank.

20. A method comprising:
(a) withdrawing liquefied cryogenic fuel from a primary insulated storage tank at a low pressure and at a temperature close to its boiling point;
(b) increasing the pressure of the withdrawn liquefied cryogenic fuel and then feeding the pressurized liquefied cryogenic fuel through a heat exchanger to warm the liquefied cryogenic fuel to a near saturated liquid condition;
(c) feeding the warmed and pressurized liquefied cryogenic fuel from the heat exchanger to a stationary insulated cryogenic fuel dispensing tank and storing the liquefied cryogenic fuel in the dispensing tank in an approximate saturated condition;
(d) transferring liquefied cryogenic fuel from the dispensing tank to a vehicle fuel tank so that the liquefied cryogenic fuel is in an approximate saturated condition; and
(e) feeding warmed and pressurized liquefied cryogenic fuel from the heat exchanger to the primary tank to maintain the pressure in the primary tank above a predetermined minimum pressure.

21. A method comprising:
(a) withdrawing liquefied cryogenic fuel from a primary insulated storage tank at a low pressure and at a temperature close to its boiling point;
(b) increasing the pressure of the withdrawn liquefied cryogenic fuel and the feeding the pressurized liquefied cryogenic fuel through a heat exchanger to warm the liquefied cryogenic fuel to a near saturated liquid condition;
(c) feeding the warmed and pressurized liquefied cryogenic fuel from the heat exchanger to a stationary insulated cryogenic fuel dispensing tank and storing the liquefied cryogenic fuel in the dispensing tank in an approximate saturated condition;
(d) transferring liquefied cryogenic fuel from the dispensing tank to a vehicle fuel tank so that the liquefied cryogenic fuel is in an approximate saturated condition; and
(e) feeding pressurized liquefied cryogenic fuel to the dispensing tank to maintain the pressure in the dispensing tank below a predetermined maximum pressure.

22. A method comprising:
(a) withdrawing liquefied cryogenic fuel from a primary insulated storage tank at a low pressure and at a temperature close to its boiling point;
(b) increasing the pressure of the withdrawn liquefied cryogenic fuel and then feeding the pressurized liquefied cryogenic fuel through a heat exchanger to warm the liquefied cryogenic fuel to an approximate saturated liquid condition;
(c) feeding the warmed and pressurized liquefied cryogenic fuel from the heat exchanger to a stationary insulated cryogenic fuel dispensing tank;
(d) feeding the warmed and pressurized liquefied cryogenic fuel from the dispensing tank through a plurality of restrictors, each restrictor communicating with a different vehicle fuel tank;
(e) sensing pressure drop across the restrictors; and
(f) maintaining a predetermined pressure drop across each of the restrictors.

23. A method comprising:
(a) withdrawing liquefied cryogenic fuel from a primary insulated storage tank at a low pressure and at a temperature close to its boiling point;
(b) increasing the pressure of the withdrawn liquefied cryogenic fuel;
(c) withdrawing cryogenic fuel from a vapor space in the primary insulated storage tank and mixing it with the pressurized liquefied cryogenic fuel to from a warmed and pressurized liquefied cryogenic fuel at a subcooled or near saturated condition; and
(e) reducing the internal pressure of a vehicle fuel tank by allowing fuel to flow from the vehicle fuel tank to the primary insulated storage tank.

24. A method comprising:
(a) withdrawing liquefied cryogenic fuel from a primary insulated storage tank at a low pressure and at a temperature close to its boiling point;
(b) increasing the pressure of the withdrawn liquefied cryogenic fuel and the feeding the pressurized liquefied cryogenic fuel through a heat exchanger to warm the liquefied cryogenic fuel to a subcooled or near saturated liquid condition;
(c) feeding the warmed and pressurized liquefied cryogenic fuel from the heat exchanger to a stationary insulated cryogenic fuel dispensing tank located at a vehicle liquefied cryogenic fuel dispensing facility and storing the liquefied cryogenic fuel in the dispensing tank in an approximate saturated condition; and
(d) withdrawing warmed and pressurized liquefied cryogenic fuel from the dispensing tank and pumping the liquefied cryogenic fuel to a vehicle fuel tank.

25. Apparatus comprising:
(a) a primary insulated storage tank containing liquefied cryogenic fuel at a low pressure and at a temperature close to its boiling point;
(b) a heat exchanger;
(c) a first conduit communicating with the primary tank and with the heat exchanger, the first conduit including a pump for withdrawing liquefied cryogenic fuel from the primary tank, increasing the pressure of the withdrawn liquefied cryogenic fuel and feeding it through a control valve to the heat exchanger wherein the pressurized liquefied cryogenic fuel is converted to pressurized and vaporized cryogenic fuel near a temperature approaching that of a heat source for the heat exchanger;

(d) a reservoir in vapor communication with the heat exchanger having means for receiving and storing pressurized and cryogenic fuel vapor from the heat exchanger;

(e) a stationary insulated dispensing tank having means for receiving and storing warmed and pressurized liquefied cryogenic fuel at an approximate saturated condition;

(f) a liquid conduit communicating with the first conduit downstream from the pump and with the dispensing tank, the liquid conduit including a control valve for receiving and controlling the flow of pressurized liquefied cryogenic fuel from the first conduit to the dispensing tank;

(g) a vapor conduit communicating with the reservoir and the liquid conduit, the vapor conduit including a control valve for controlling the flow of pressurized and vaporized cryogenic fuel from the reservoir to the liquid conduit for mixture with pressurized liquefied cryogenic fuel to form a pressurized liquefied cryogenic fuel at an approximate saturated condition; and (h) a second conduit communicating with the dispensing tank and having means for feeding warmed and pressurized liquefied cryogenic fuel from the dispensing tank to a vehicle fuel tank.

26. Apparatus of claim 25 wherein the second conduit includes a pump for withdrawing warmed and pressurized liquefied cryogenic fuel from the dispensing tank and feeding it to the second conduit.

* * * * *